US012651199B2

(12) United States Patent
Ferreira et al.

(10) Patent No.: US 12,651,199 B2
(45) Date of Patent: Jun. 9, 2026

(54) HORIZONTAL FEDERATED FOREST VIA SECURE AGGREGATION

(71) Applicant: Dell Products L.P., Round Rock, TX (US)

(72) Inventors: Paulo Abelha Ferreira, Rio de Janeiro (BR); Adriana Bechara Prado, Niterói (BR)

(73) Assignee: Dell Products L.P., Round Rock, TX (US)

( * ) Notice: Subject to any disclaimer, the term of this patent is extended or adjusted under 35 U.S.C. 154(b) by 756 days.

(21) Appl. No.: 17/937,225

(22) Filed: Sep. 30, 2022

(65) Prior Publication Data

US 2024/0119340 A1    Apr. 11, 2024

(51) Int. Cl.
*G06N 20/00*        (2019.01)
*G06F 18/24*        (2023.01)
*G06F 21/62*        (2013.01)

(52) U.S. Cl.
CPC ............. *G06N 20/00* (2019.01); *G06F 18/24* (2023.01); *G06F 21/6218* (2013.01)

(58) Field of Classification Search
CPC ..... G06F 18/24; G06F 21/6218; G06N 20/00; G06N 5/01
See application file for complete search history.

(56) References Cited

U.S. PATENT DOCUMENTS

2021/0174257 A1    6/2021    Pothula et al.
2021/0374617 A1    12/2021    Chu et al.

2022/0230071 A1    7/2022    Liu et al.
2022/0351090 A1    11/2022    Tian et al.
2023/0084325 A1    3/2023    Zhang et al.
2024/0005215 A1    1/2024    Ong et al.

OTHER PUBLICATIONS

Yao et al., "An Efficient and Robust System for Vertically Federated Random Forest", Jan. 26, 2022, arXiv: 2201.10761v1, pp. 1-11. (Year: 2022).*
Rabcan et al., "Selection of appropriate candidates for a type position using C4.5 decision tree", Sep. 4, 2017, 2017 International Conference on Information and Digital Technologies (IDT), pp. 332-338. (Year: 2017).*

(Continued)

*Primary Examiner* — Brent Johnston Hoover
(74) *Attorney, Agent, or Firm* — Workman Nydegger

(57)        ABSTRACT

One example method includes constructing a machine learning model which, when completed, is operable to screen candidates, from a group of candidates, to define a candidate pool that has specified characteristics. The constructing includes: broadcasting, from a central node to edges of a federation, an indication that construction of a random forest, of the machine learning model, has started; performing a federated feature categorization, by the central node based on information received from the edges, of a feature to be included in respective decision trees of the edges; based on the categorizing, broadcasting a feature category to the edges; performing, by the central node using respective purity information received from the edges, a federated purity calculation; and based on the federated purity calculation, broadcasting, by the central node to the edges, a winning feature split for the feature.

18 Claims, 5 Drawing Sheets

(56) References Cited

OTHER PUBLICATIONS

Zhang et al., "SAFELearning: Enable Backdoor Detectability In Federated Learning With Secure Aggregation", Sep. 3, 2021, arXiv: 2102.02402v2, pp. 1-18. (Year: 2021).*

Gencturk et al., "BOFRF: A Novel Boosting-Based Federated Random Forest Algorithm on Horizontally Partitioned Data", Aug. 26, 2022, IEEE Access, vol. 10, pp. 89835-89851. (Year: 2022).*

U.S. Appl. No. 17/937,225, filed Sep. 30, 2022.

Liu, Y., Liu, Y., Liu, Z., Liang, Y., Meng, C., Zhang, J., & Zheng, Y., "Federated Forest," IEEE Transactions on Big Data, 2020.

Bonawitz, Keith, et al. "Practical Secure Aggregation for Privacy-Preserving Machine Learning," proceedings of the 2017 ACM SIGSAC Conference on Computer and Communications Security, 2017.

L. Breiman, J. Friedman, R. Olshen, and C. Stone, "Classification and Regression Trees", Wadsworth, Belmont, CA, 1984.

Jones et al., Federated XGBoost on Sample-Wise Non-IID Data, Sep. 2022. (Year: 2022).

* cited by examiner

HORIZONTAL FEDERATED FOREST VIA SECURE AGGREGATION

FIELD OF THE INVENTION

Embodiments of the present invention generally relate to federated learning. More particularly, at least some embodiments of the invention relate to systems, hardware, software, computer-readable media, and methods, for training Random Forest (RF) classification models in a Federated Learning (FL) setting, while using a secure aggregation process to enhance and maintain data privacy.

BACKGROUND

Predicting the success of future employees based on current employees, as is done with custom algorithmic pre-employment assessments, potentially reduces the chance of increasing diversity in a company because hiring new candidates inherently skews the task toward finding candidates resembling those who have already been hired. Indeed, very few companies disclose specifics on how these tools perform for a diverse group of applicants, for example, with respect to gender, ethnicity, race, age, and/or other considerations, and if/how the company can select candidates in a fair, and explainable, way. Also, companies may be shielded by intellectual property laws and privacy laws, such that the companies cannot be compelled to disclose any information about their models and how the model internals work. More transparency is necessary to better evaluate the fairness and effectiveness of tools such as these.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figures 1, 2:
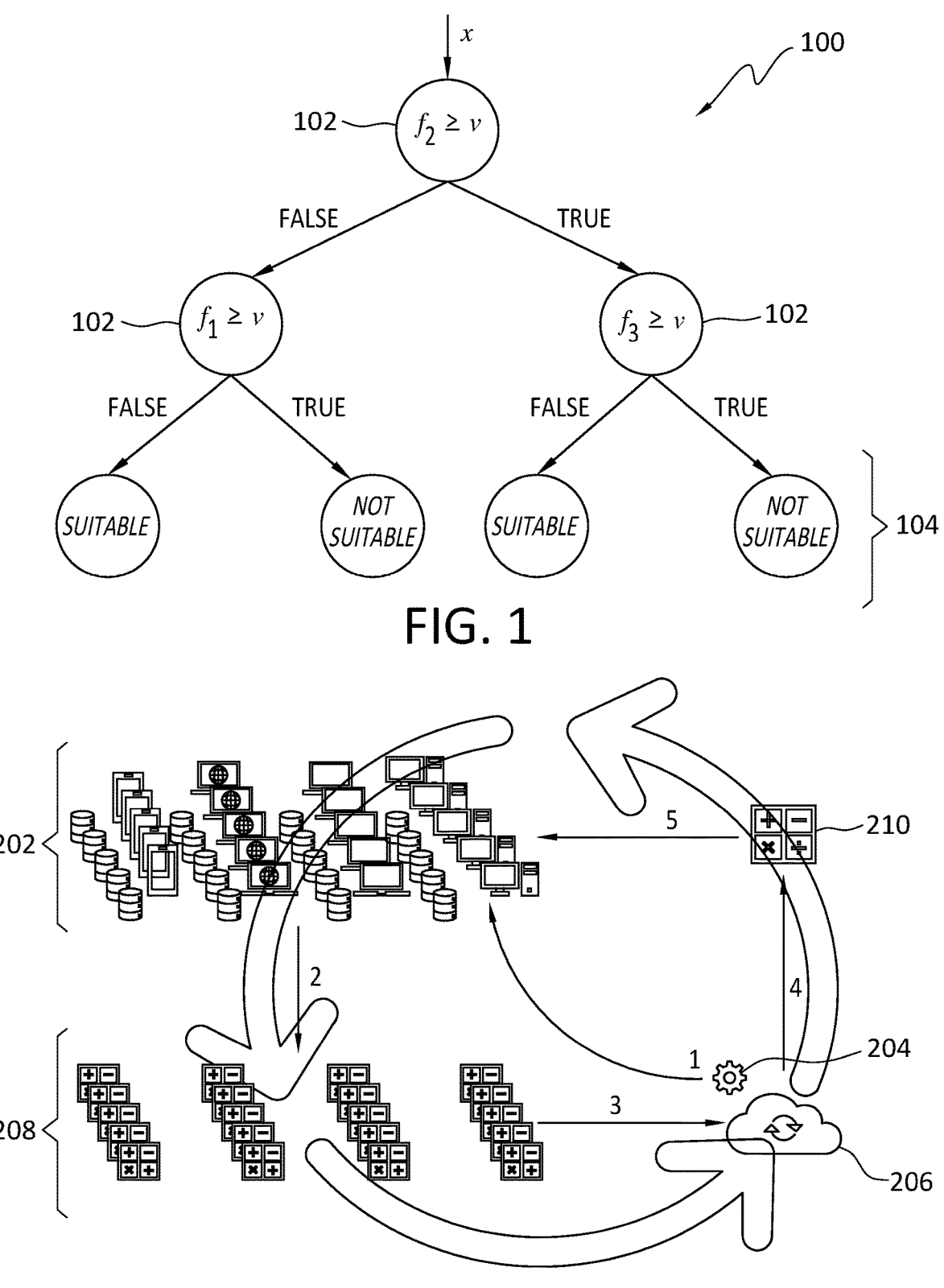
FIG. 1 discloses aspects of an example decision tree classifier, where leaves are the possible classes.
FIG. 2 discloses an example federated learning setting.

Embodiments of the present invention generally relate to federated learning. More particularly, at least some embodiments of the invention relate to systems, hardware, software, computer-readable media, and methods, for training Random Forest (RF) classification models in a Federated Learning (FL) setting, while using a secure aggregation process to enhance and maintain data privacy.

In general, some example embodiments of the invention are directed to a protocol for Horizontal Federated Forest via Secure Aggregation, particularly, a merging of two elements, namely, Random Forest models, and the Secure Aggregation protocol in Horizontal Federated Learning.

Embodiments of the protocol may be based on the insight that most, if not all, purity measures for splitting nodes during decision trees construction require only two things, namely, (1) counting the number of feature-value occurrences, or bins in the case of continuous features, per possible label, and (2) knowing the total number of samples per feature-value, in order to normalize the sum into a probability. Example embodiments may compute both of these in a private manner across edge nodes, and then compute the purity measure for each feature and decide on the best split centrally.

Applied in this context, a secure aggregation protocol may enable the computation of sums of values, while still preserving the privacy of each component, or edge node, that contributes to the sum. Additionally, some embodiments may also compute the total count for a given feature by performing secure aggregation on the individual counts. To this end, some embodiments may define and implement a protocol that uses secure aggregation to compute the purity (splitting) value for each feature and thus construct a common decision tree, and associated Random Forest (RF) that includes the decision tree, in a private manner from all edge nodes. Embodiments may also employ a scheme for privately computing possible ranges for continuous features.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, some embodiments of the invention may help to ensure the fairness, and transparency, of a machine learning model, while preserving the privacy of data used in the training of the model. Thus, some embodiments may be particularly useful in the context of machine learning models that are used to screen job candidates and make hiring recommendations, although the scope of the invention is not limited to this example application. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

The following is an overview concerning aspects of some example embodiments of the invention. This discussion is not intended to limit the scope of the invention, or the applicability of the embodiments, in any way. Further, while reference is made to application of some embodiments in a job candidate screening and hiring process, such application is provided only by way of illustration and is not intended to limit the scope of the invention in any way. Thus, some embodiments may be applicable in other fields as well including, but not limited to, activities such as medical diagnosis, self-driving cars, sales projections, HR (Human Resource) decisions, and hardware prototyping.

Regarding the illustrative use case of HR decisions, a fair and thorough candidate screening process is a vital process for the overall company's fairness, diversity, and inclusion goals. According to the literature, there are four main distinct stages of the hiring pipeline, namely, sourcing, screening, interviewing, and selection. Sourcing includes building a candidate pool, which is then screened to choose a subset to interview.

An example application for some embodiments of the invention concerns job candidate screening, particularly, some embodiments may be directed to approaches for obtaining a fair screening that leads to a diverse pool of candidates to be considered. With the current advent of Machine Learning (ML) in many different areas, it is no surprise that candidate screening is currently also being partly automated. One example of such automation is the classification of candidates based on personality trait features such as, for example, the introvert to extrovert spectrum, or the candidate enthusiasm spectrum.

However, many of the successful classification models can be biased or opaque to explainability. As such, there is interest in using models that are more explainable by nature to provide transparency, as it is the case of Decision Trees/Random Forests. Explainable Artificial Intelligence (XAI) is a growing area of research where one is interested in understanding the rationale behind the output or decision of an AI model. This may be of utmost interest now that AI models are deployed in high-risk/high-cost activities such as, but not limited to, areas including medical diagnosis, self-driving cars, sales projections, HR decisions and hardware prototyping. Explainability can help in accountability, decision-making, model management and in constructing insights from models.

Random Forests are effective and transparent Machine Learning models capable of regression and classification. At present however, there are no Federated Learning protocols for training Random Forests in the Horizontal Federated Learning setting, in which nodes share features, but not samples, while using Secure Aggregation to enhance privacy. Thus, some example embodiments are directed to a protocol for Horizontal Federated Forest via Secure Aggregation.

B. Context

In this section, there are described various concepts that relate to some embodiments of the invention. As noted earlier, example embodiments may merge two elements, namely, Random Forest models and the Secure Aggregation protocol in Horizontal Federated Learning. These are each discussed in turn in the following subsections.

B.1 Random Forests

B.1.1 Overview

Some embodiments are directed to addressing the problem of classification. For example, consider the problem related to candidate screening, in which one could be interested in predicting classes, such as 'Suitable' or 'Not suitable' for the job, based on personality trait features, such as introvert to extrovert spectrum or enthusiasm spectrum, which are the input values to the prediction model. For a single input, each attribute may be referred to herein as a 'feature.' One example of a Machine Learning model that can perform such a task is a Random Forest classifier.

A random forest classifier can predict a categorical output value, that is, a class, by exploiting what are referred to as decision trees. In general, each decision tree runs the input through a series of inequality tests over the feature-values of the input until the input ends up in a leaf of the decision tree. This leaf contains the predicted class for the given input. An example of a decision tree is denoted at 100 in FIG. 1.

With reference to the decision tree 100, assume an input X having three features called f1, f2, and f3. To predict the class for X, that is, the classification of X, such input runs through the decision tree 100 and passes a series of inequality tests 102 over its attribute-values. That is, each node corresponds to a particular feature and the input either possesses a particular value of that feature, or it does not. When the answer is negative, the input goes to the left, and when the answer is positive, the input runs to the right. Each inequality test, which by their nature are binary, directs the input towards a subset of internal nodes until the input reaches a leaf 104.

Thus, for example, if the value of feature f2 for the input is greater than, or equal, to value v, then the input runs to the right where feature f3 is assessed. Continuing, if the value of feature f3 for the input is greater than, or equal, to value v, then the input runs to the right and ends at the leaf 104 indicating 'Not Suitable.'

A decision tree classifier may be learned from data observations or examples. A random forest classifier may comprise many different decision trees whose results may be compiled, such as through use of a majority vote mechanism, into one final classification for an input. The idea behind applying many decision trees is to increase variability and decrease the chance of overfitting the training data, that is, applying a single decision tree that is too fine-tuned to the training set and performs poorly in the test set.

Random forests may have various advantages over other Machine Learning models for classification. Particularly, random forests may: (1) require few hyperparameters—that is, parameters that may need to be set a priori and cannot be learned; (2) be efficient to build and not require complex infrastructure for learning; (3) be efficient to execute when predicting; and (4) be more explainable than other black-box models, such as Neural Networks (NN).

B.2 Federated Learning

Federated Learning (FL) is a machine learning technique where the goal is to train a centralized model while the training data, used to train the centralized model, remains distributed on many client nodes. Usually, the network connections and the processing power of such client nodes are unreliable and slow. The main idea is that client nodes can collaboratively learn a shared machine learning model, such as a deep neural network for example, while keeping the training data private on the client device, so the model can be learned without storing a huge amount of data in the cloud, or in the central node. Every process that involves many data-generating nodes may benefit from such an approach, and these examples are countless in the mobile computing world.

In the context of FL, a central node can be any machine with reasonable computational power that receives the updates from the client nodes and aggregates these updates on the shared model. A client node, such as an edge node, may be any device or machine that contains data that will be used to train the machine learning model. Examples of client nodes include, but are not limited to, connected cars, mobile phones, IoT (Internet of Things) devices, storage systems, and network routers.

The training of a Neural Network in a Federated Learning setting, shown in the example method of FIG. 2, may operate in the following iterations, sometimes referred to as 'cycles':

1. the client nodes 202 download the current model 204 from the central node 206—if this is the first cycle, the shared model may be randomly initialized;
2. then, each client node 202 trains the model 204 using its local data during a user-defined number of epochs;
3. the model updates 208 are sent from the client nodes 202 to the central node 206—in some embodiments, these updates may comprise vectors containing the gradients;
4. the central node 206 may aggregate these vectors and update the shared model 210; and
5. when the pre-defined number of cycles N is reached, finish the training—otherwise, return to 1.

B.2.1 Secure Aggregation

Model updates transferred between nodes in federated learning still carry information that may be used to infer properties of, or sometimes recover part of, the data used for training. Therefore, under strong privacy guarantees, the federated learning framework described above incorporates a secure aggregation protocol.

Thus, instead of having access to each client update, the server will only have access to a sum of the client updates. More concretely, a protocol may be implemented where the server can only learn the sum of K inputs, but not the individual inputs, where these inputs may be the, relatively large, machine learning model update vectors from each client.

With some embodiments of this protocol, individual users, such as edge nodes, may construct pairwise masking vectors that cancel each other out when summed at the central node. The protocol may begin with an exchange of pairwise keys through a scheme such as the Diffie-Hellman key agreement, for example. Each pairwise key may be used as a seed to a pseudo-random number to generate 0-sum masks for each pair of clients. There is also a part of the protocol for dealing with user dropout, and this may involve a Shamir secret sharing scheme.

Figure 3:
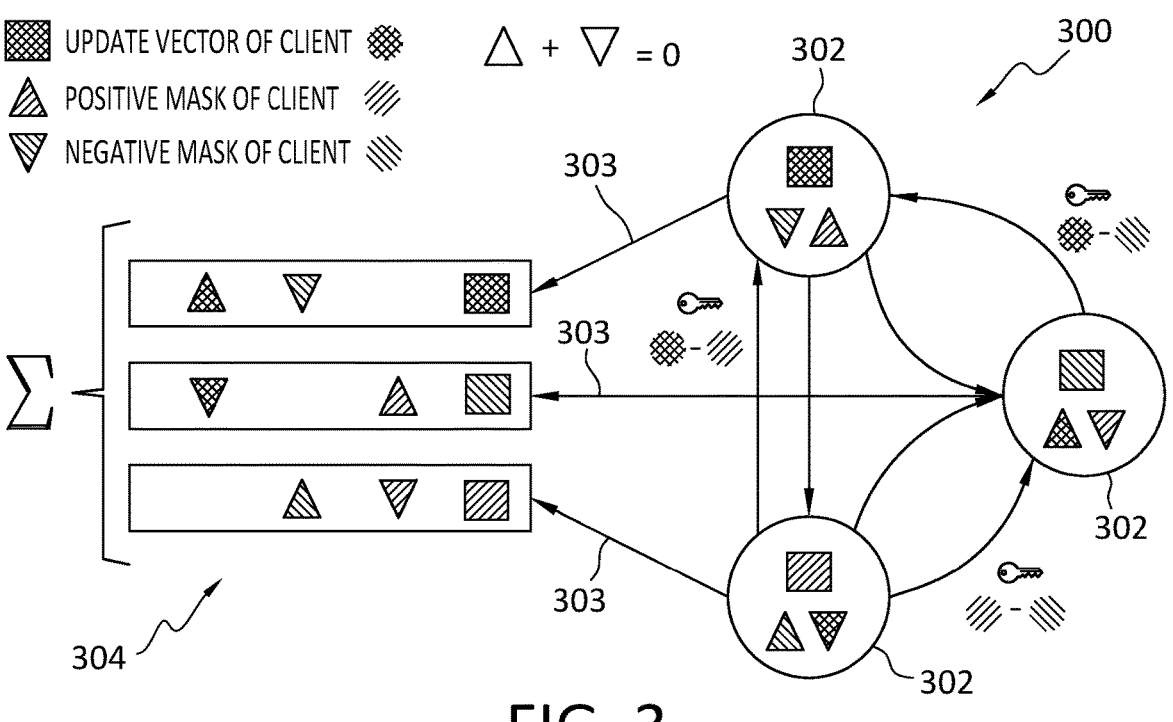
FIG. 3 discloses an overview of an example secure aggregation protocol.

In FIG. 3, there is disclosed a graphical representation 300 of a Secure Aggregation protocol, where three nodes 302, or 'clients' in FIG. 3, construct pairwise masks that may be transmitted to the central node 304 as vectors 303, and which may cancel each other out at the central node 304. If a malicious or curious attacker has access to one of the vectors 303 coming from a given participant node 302, she could not access any information since the vector has all the halves from all pairwise masks from each client 302. The secure aggregation protocol may thus enable calculation of the sum of distributed vectors from a group of nodes, while guaranteeing that zero information about any particular edge node can be obtained by an entity that access only one of the vectors 303.

C. Further Aspects of Some Example Embodiments

As noted earlier, some embodiments are directed to a protocol for Horizontal Federated Forest via Secure Aggregation. Some embodiments of this protocol may be based on the insight that most, if not all, purity measures for splitting nodes during construction of a decision tree may require only two things: (1) counting the number of feature-value occurrences, or bins for continuous features, per possible label; and (2) knowing the total number of samples per feature-value, so as to enable normalization of the sum into a probability. Moreover, according to some embodiments, these two computations may be performed in a private manner through a Secure Aggregation process.

The following section discusses aspects of example embodiments of such a protocol, and since decision trees are often referred to as including nodes, and the discussion also refers to edge nodes, the following discussion will use a different terminology for the purposes of clarity.

Tree: A Decision Tree

Node: A node of a tree

Central: The central computation device (for example, a Near Edge, or a Cloud)

Edge: An edge device (for example, a local computation infrastructure of a customer.

C.1 Horizontal Federated Forest

There are many variations on the algorithm for constructing a Random Forest (RF). Some embodiments of the invention comprise a distributed and federated protocol for constructing Decision Trees that may compose the RF ensemble. The protocol may be a version of Horizontal Federated Learning and so it may be assumed, for the purposes of some embodiments at least, that all Edges share the same features across datasets, albeit the Edges may not be sharing the same samples. In some embodiments, all Edges participate in the construction of all trees, and trees are constructed one by one. The algorithm for constructing a tree is recursive and some embodiments may construct a tree node by node.

This section focuses on aspects that are key to maintaining the privacy of Edges. We envision the possibility of including many aspects of Random Forest construction, such as bagging, for instance. In such a case, each Edge may select a subset of its own samples to be considered for each tree, but this does not typically influence privacy. The same may be true for other aspects of the general Random Forest construction algorithm, but some embodiments may place particular emphasis on aspects that could compromise privacy, such as the privacy of data at one or more Edges, that is, aspects such as calculating feature characteristics, and splitting measures.

In some embodiments, the protocol may start with Central broadcasting the start of a new RF model to all selected Edges. Also, at the start of the construction of each tree, Central may broadcast, to the Edges, the beginning of a new tree. It is also possible for Central to samples a subset of all features that will be used for each tree and broadcast this to the Edges.

Prior to starting to construct a tree, each Edge may sample its own dataset (with replacement) to decide on the samples that will be used for the current tree. Then, each tree starts at the root node and each consecutive node is built recursively in the same manner as described below. Note that all nodes of all trees may be created by all Edges so that in the end, there is a unique RF model shared by all the Edges.

In a non-specific version of the RF algorithm, to build a node of a tree, there may be a need to decide on the best split for that node. To compare splits, embodiments may calculate the node purity that would be achieved if a particular feature split were selected. The feature split yielding the highest purity of the target value is selected for that node. A given node purity is calculated based on the combined purity calculated for its child nodes. Note that as used herein, 'purity' includes the notion that for a given feature split at a given node, the inputs that possess the target value classes as closely balanced as possible with the inputs that do not possess the target values balanced. For example, given 10 inputs to a node associated with a particular feature split, highest purity would be reflected by an even feature split into two child nodes such that one of the child nodes has all 5 target values of the same given class and the other child node has the other 5 target values of another given class.

To list all possible splits, all features may be categorized. Discrete features may be naturally categorized into the possible discrete values, while continuous features, on the other hand, may need to be binned, that is, divided into discrete ranges.

In the distributed case, all Edges may share the same features, but they might have different values for each feature. However, the Edges may need to agree on the categorization of all features for the split comparisons to make sense. Therefore, the Edges may jointly decide on what will be the categorizations of each feature, but the Edges may do so privately. Example embodiments of an approach for this are discussed in Section C.2 below, in what is referred to as Federated Feature Categorization. This feature categorization may be done only once, at the start of a new RF construction protocol.

After all features have been categorized, embodiments may perform comparable splits on all Edges. At the construction of every node, each Edge may perform a purity calculation considering all splits of all features, or a selected subset thereof. For each feature split, the yielded purity may be calculated, while considering the resulting purity coming from all Edges, without revealing an undue amount of private information from any of the Edges. This may be done through a Federated Purity Calculation scheme, detailed in Section C.3, below.

Note that, in general, a feature split may comprise a mechanism to divide a dataset, such as into a portion that includes the feature, and a portion that does not. To illustrate, the feature 'age' may be used to split a dataset of candidates into three portions thus: (1) candidates with age ≤25; (2) candidates with age >25 and ≤30; and (3) candidates with age >30. Some feature splits may be binary, such that they may divide a dataset into a portion that includes the feature, and a portion that does not include the feature. Multiple features may be applied simultaneously to split a dataset.

Once the purity for all feature splits has been calculated, Central may broadcast the winning feature split, that is, the feature split with the highest purity, and each Edge will then know the best feature split to use to construct the current node. Then, embodiments may recursively step towards the next node and repeat the same process, but now for the subset of samples that arrive at the current node.

C.2 Federated Feature Categorization

In the Horizontal Federated Learning setting, some embodiments may assume that all Edges agree on the features and feature splits. Therefore, for discrete features, there may be no joint categorization to be performed, since all Edges will already agree on the categories.

For continuous features, each Edge may communicate, to Central, its respective minimum and maximum values of the given feature. Central may then take the minimum of all minima that have been reported by the Edges, and the maximum of all maxima that have been reported by the Edges, to define a global range, spanning all the Edges, for that feature. This scheme reveals only the minimum and maximum of each Edge, which is not enough information to compromise the privacy of the Edges.

Figure 4:
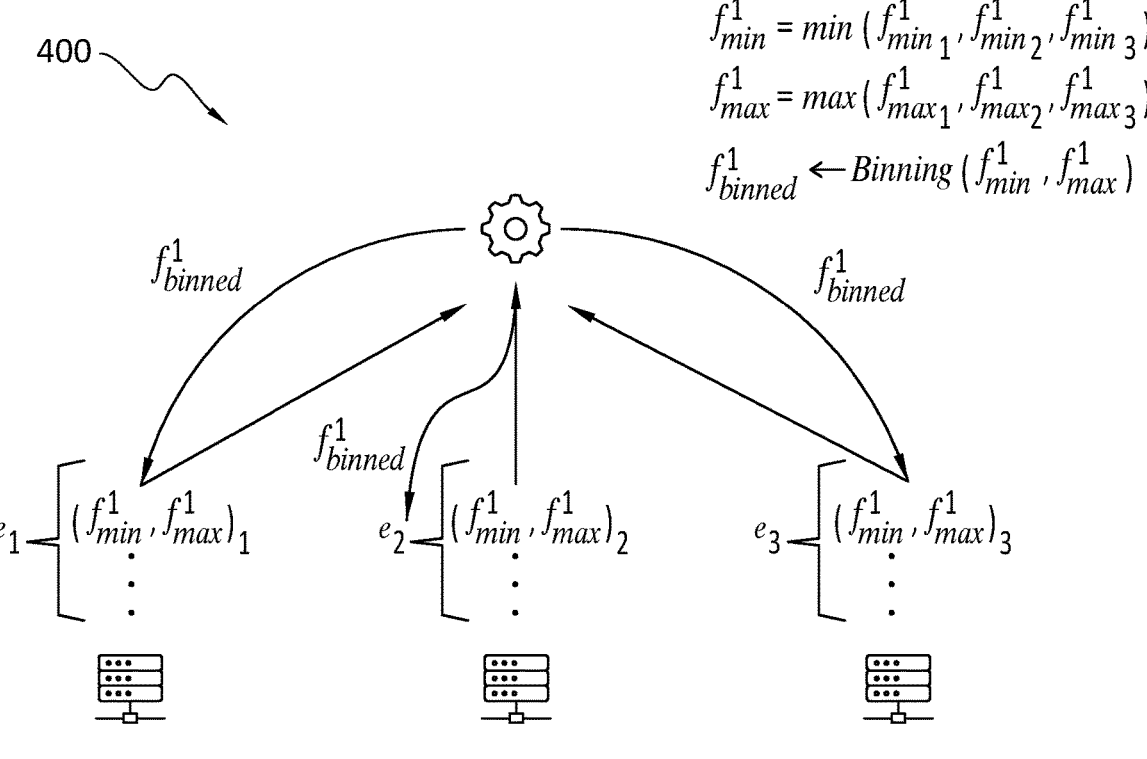
FIG. 4 discloses an example binning method for continuous features.

After having defined a global range for a given continuous feature, Central may then calculate bins for this feature using any one of possible methods for binning. FIG. 4 discloses one example of a binning method 400 for one or more continuous features.

One, non-limiting, example of a binning method is to uniformly split the continuous feature into K bins. Any method may be used that does not require Central to know the actual values for the feature, but only the range, that is, the global minimum and global maximum values. The actual method use for discretization may be determined using any suitable approach. Once a continuous feature has been categorized, these bin values, that is, the global minimum and global maximum, may be broadcast by Central back to the Edges. The Edges may then use this information to perform splits on their respective private data samples.

C.3 Federated Purity Calculation

To construct a tree node, some embodiments may calculate the impurity, that is, the splitting measure, and do so for all feature splits. This calculation may be performed in relation to all samples arriving at a given tree node. There are various methods for performing the splitting measure and some of them involve calculating the probability p(i) of picking a datum with target class i for each category of the feature split. In the case of discretized continuous features, p(i) may be calculated for each discrete value. Another method is determining, as a measure of purity, the Information Gain (IG) for a given feature fj, which is given by the relation:

$$IG_{f_j} = H_{parent} - \sum_k \frac{H_{f_j^k}}{N_{parent}}$$

Figures 5, 6:
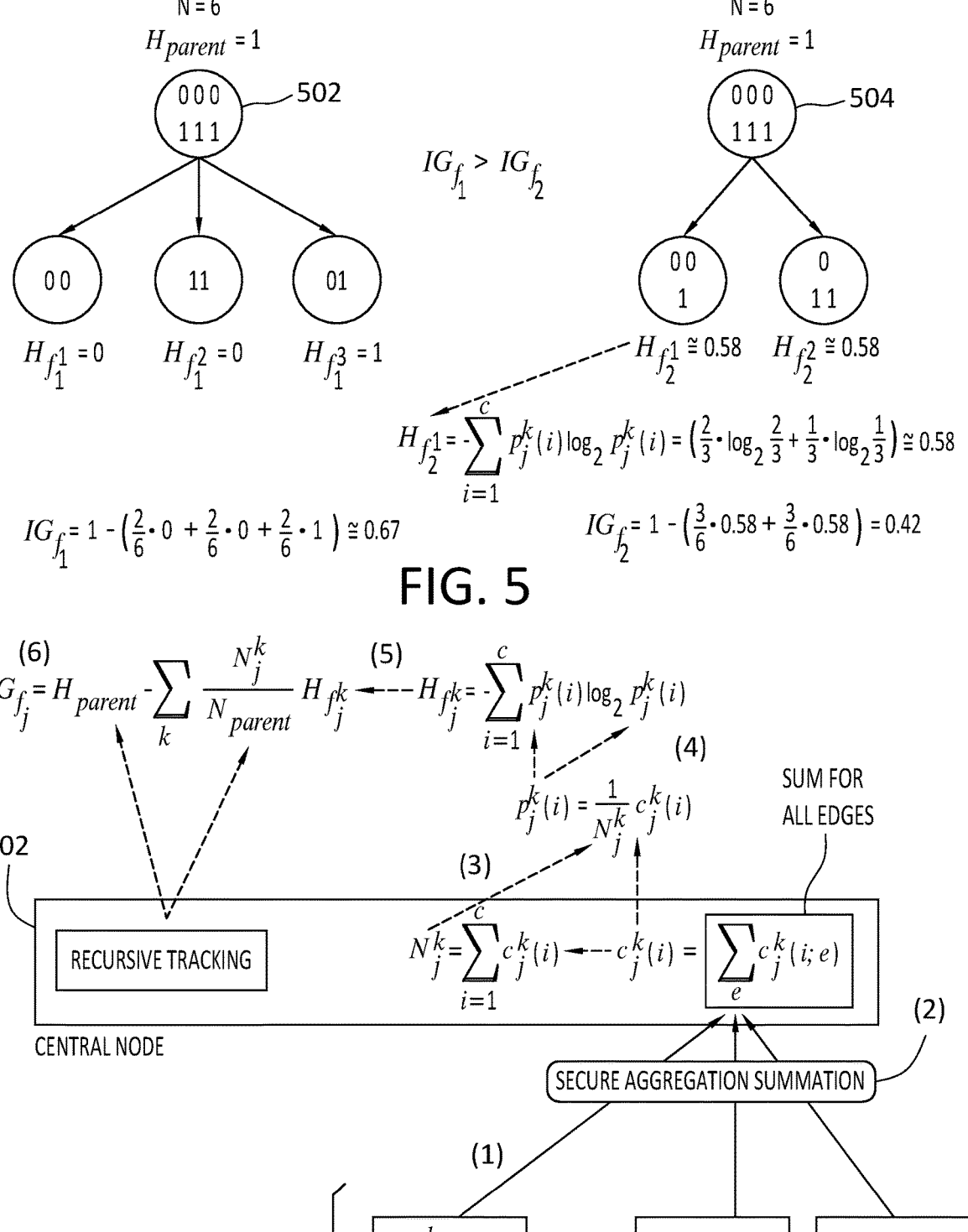
FIG. 5 discloses an example method to calculate information gain for two C-different features and their split children.
FIG. 6 discloses an example of distributed and private calculation of the information gain using information privately received from many edge devices.

FIG. 5 shows information gain being calculated for two different features 502 and 504 and their split children. Particularly, FIG. 5 discloses the Information Gain being calculated for two different features $f_1$ and $f_2$. As shown, feature $f_1$ has three splits, namely, $$f_1^1, f_1^2 \text{ and } f_1^3,$$

and feature $f_2$ has two splits, namely, $$f_2^1 \text{ and } f_2^2.$$

9                 10

In total then, there are 5 feature splits in this example. The calculation is as shown in FIG. 5, where some embodiments may obtain the probabilities $$p_j^k$$

(i) for every feature split $$f_j^k$$

and class i. Using $$p_j^k$$

(i), an embodiment may obtain the entropy for the Information Gain calculation. As shown in FIG. 5, feature $f_1$ results in higher information gain (0.67) and therefore would be chosen in favor of $f_2$, which has a lower information gain (0.58).

FIG. 6 discloses a distributed, and private, calculation of the Information Gain using respective information privately provided to Central 602 from each of many Edges 604. Particularly, FIG. 6 discloses an overview of the information flow to calculate Information Gain for each feature $f_j$. In general:

(1) each Edge may calculate its count per class for each feature split $$c_j^k$$

(i; e); and, (2) Central may then coordinate a Secure Aggregation round to compute the summed counts:

$$c_j^k(i) = \sum_e c_j^k(i, e)$$

This process may be performed for all features, and their respective splits. Note that Edges may communicate all $$c_j^k$$

(i; e) in a single round as a list $$\left( c_j^k(i; e) \right)$$

of size equal to the number of feature splits.

(3) from $$c_j^k$$

(i), an embodiment may calculate:

$$N_j^k = \sum_{i=1}^{C} c_j^k(i)$$

(4) next, $$c_j^k$$

(i) and $$N_j^k$$

may be used to calculate the probabilities:

$$p_j^k(i) = \frac{1}{N_j^k} c_j^k(i)$$

(5) with the probabilities, $$H\{sub\} f_j^k$$

may be calculated, (6) and using $$H\{sub\} f_j^k,$$

some embodiments may calculate, for a feature $f_j$, the information gain:

$$IG_{f_j} = H_{parent} - \sum_k \frac{H_{f_j^k}}{N_{parent}}$$

(7) note that $H_{parent}$ and $N_{parent}$ can be taken track of by storing them at each node in the tree (possibly only at Central) every time we choose a best split.

(8) once the Information Gain $IG_{fj}$ is calculated for all features $f_j$, embodiments may then select the feature with the highest IG one the best feature on which to split, that is, as the best feature to associate with a node of a tree.

(9) finally, the best feature may be communicated by Central to all Edges, which may then split their own trees accordingly.

As apparent from the foregoing, an insight of some embodiments is that what enables the feature splitting choice to be Federated is that the calculation of Information Gain can be reduced to calculations of sums of elements coming from the Edges. It is noted that above scheme would work for any feature splitting measure that requires only the computation of sums over private components. One such example of a different measure than Information Gain would be the Gini Impurity measure that requires also only the computation of p(i). Thus, some embodiments implement a protocol for performing Horizontal Federated Learning for distributed construction of Random Forest classification models with privacy guarantees for the Edges and their data.

D. Example Methods

Figure 7:
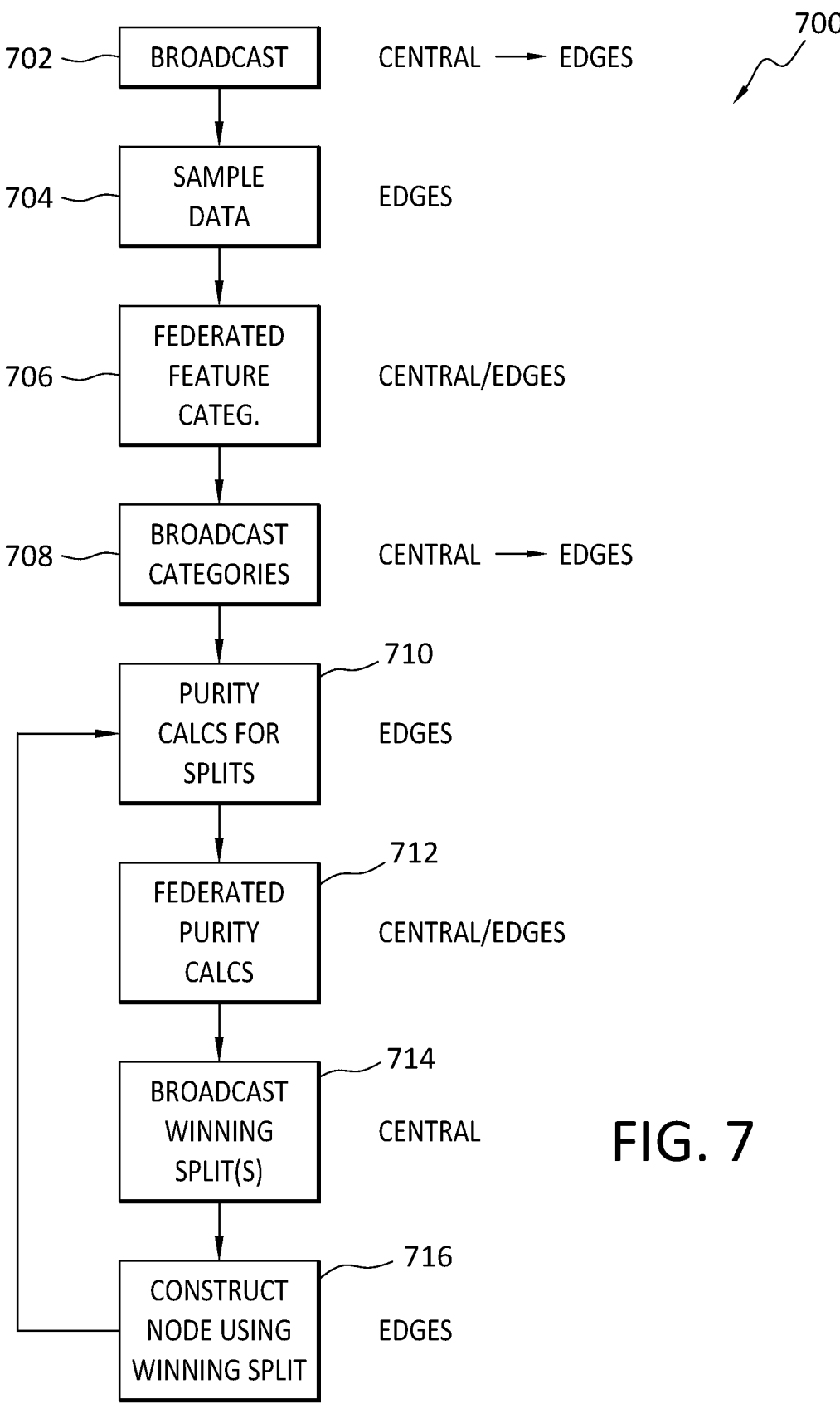
FIG. 7 discloses an example method according to some embodiments.

It is noted with respect to the disclosed methods, including the example method of FIG. 7, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 7, an example method 700 according to some embodiments is disclosed. The method 700 may be cooperatively performed in an environment that includes both a central node and a federation of edges. The edges may, or may not, all be associated with a single business entity for example. In some instances, the edges are associated with different respective entities, such that there is a need to maintain the confidentiality of edge data vis a vis the other edges in the federation. The method 700 may comprise the construction of an ML model that may be operable to screen candidates, from a group of candidates, to define a candidate pool that has particular desired characteristics. In some embodiments, the candidates may be job candidates, but that is not required, and constitutes only an illustrative embodiment of the invention.

The method 700 may begin when a central node broadcasts 702 the start of a new RF model. The central node may or may not be associated with a single business entity, which may provide ML model construction/training as a service to a federation of edges. At 704, the edges may sample their local respective datasets to select data for use in construction of respective decision trees at the edges.

The central node may then, based on input received from the edges, categorize 706 the features to be included in the decision trees at each of the edges. The collective action of the central node and the edges here may comprise a federated feature categorization process. Note that the features may be categorized 706 without any of the edges sharing or revealing its data to any of the other edges.

After the features have been categorized 706, the central node may then broadcast the categories 708 to the edges. Note that the group of features may be the same at each of the edges, although there may be no data sharing between/among the edges.

The edges may then perform respective purity calculations 710 for feature splits for each of the categorized features. The resulting respective purity information from each of the edges may be transmitted by the edges to the central node.

The central node may then perform a federated purity calculation 712 based on the respective purity information received from each of the edges. Based on the federated purity calculation 712, the central node may then determine, and broadcast 714, the winning feature split(s), that is, the feature splits with the highest purity.

Finally, the edges may receive the winning split information from the central node and may use that information to construct a node of their respective trees. In this way, each of the edges will have the same tree, and the same RF. Part, or all, of the method 700, such as the operations 710 through 716, may be performed recursively until each tree at each edge is completed. Once the RF at each edge is completed, the ML model may be ready to be trained and deployed.

E. Further Example Embodiments

Following are some further example embodiments of the invention. These are presented only by way of example and are not intended to limit the scope of the invention in any way.

Embodiment 1. A method, comprising: constructing a machine learning model which, when completed, is operable to screen candidates, from a group of candidates, to define a candidate pool that has specified characteristics, and the constructing comprises: broadcasting, from a central node to edges of a federation, an indication that construction of a random forest, of the machine learning model, has started; performing a federated feature categorization, by the central node based on information received from the edges, of a feature to be included in respective decision trees of the edges; based on the categorizing, broadcasting a feature category to the edges; performing, by the central node using respective purity information received from the edges, a federated purity calculation; and based on the federated purity calculation, broadcasting, by the central node to the edges, a winning feature split for the feature.

Embodiment 2. The method as recited in embodiment 1, wherein the federated purity calculation is based on an information gain determined for the feature.

Embodiment 3. The method as recited in any of embodiments 1-2, wherein the federated feature categorization is performed without any exchange of data among the edges.

Embodiment 4. The method as recited in any of embodiments 1-3, wherein the federated purity calculation is performed without any exchange of data among the edges.

Embodiment 5. The method as recited in any of embodiments 1-4, wherein each of the edges corresponds to a respective business entity to which the central node provides construction of the model as a service.

Embodiment 6. The method as recited in any of embodiments 1-5, wherein the feature is an attribute of one of the candidates.

Embodiment 7. The method as recited in any of embodiments 1-6, further comprising training, by the central node, the machine learning model using information received by the central node from the edges.

Embodiment 8. The method as recited in embodiment 7, wherein the information from the edges is securely aggregated to prevent an unauthorized actor from accessing any information of any of the edges.

Embodiment 9. The method as recited in embodiment 7, wherein the information received by the central node from the edges comprises one or more pairwise masking vectors which, when summed by the central node, cancel each other out.

Embodiment 10. The method as recited in embodiment 7, wherein the information received by the central node from the edges comprises one or more pairwise masking vectors, and a pairwise masking vector from one of the edges comprises respective halves of pairwise masks from each of the other edges.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
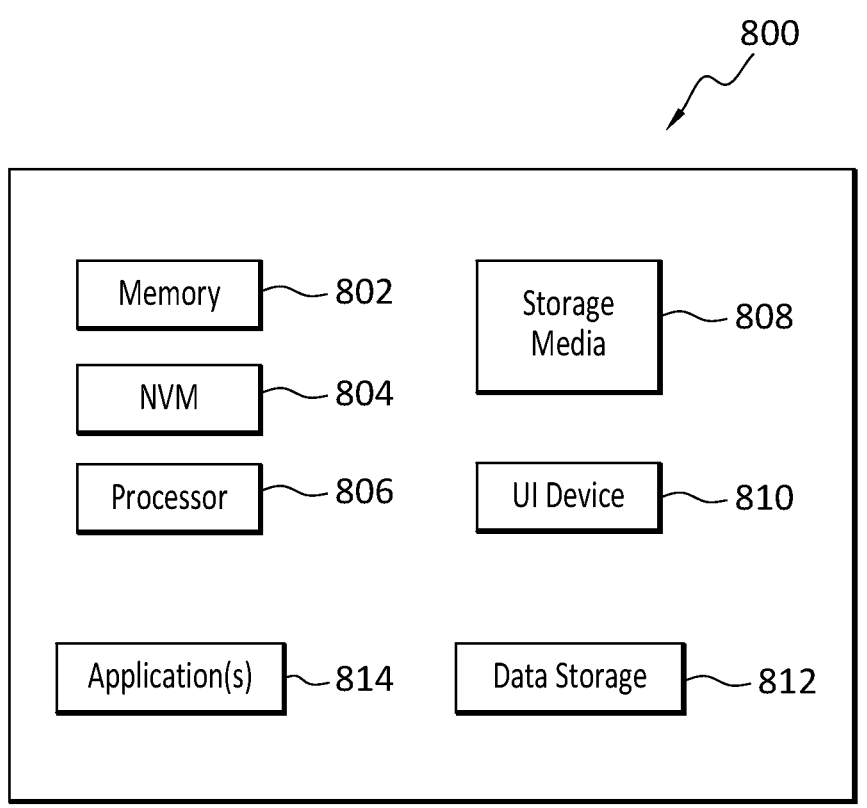
FIG. 8 discloses an example computing entity operable to perform any of the disclosed methods, processes, and operations.

With reference briefly now to FIG. 8, any one or more of the entities disclosed, or implied, by FIGS. 1-7 and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI (user interface) device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A method comprising:

constructing a machine learning model which, when completed, is operable to screen candidates, from a group of candidates, to define a candidate pool that has specified characteristics, wherein the constructing comprises:

broadcasting, from a central node to edge nodes of a federation, an indication that construction of a random forest of the machine learning model has started;

performing a federated feature categorization based on information received from the edge nodes, wherein the federated feature categorization includes categorizing a feature that is to be included in respective decision trees of the edge nodes;

based on the categorizing, broadcasting a feature category to the edge nodes;

performing, by the central node using respective purity information received from the edge nodes, a federated purity calculation; and based on the federated purity calculation, broadcasting, by the central node to the edge nodes, a winning feature split for the feature, wherein the federated purity calculation and the federated feature categorization are performed using a secure aggregation protocol that employs pairwise masking vectors that are structured in a manner so as to guarantee that zero information about any particular edge node can be obtained by an entity that has access to only one of the pairwise masking vectors.

2. The method as recited in claim 1, wherein the federated purity calculation is based on an information gain determined for the feature.

3. The method as recited in claim 1, wherein the federated feature categorization is performed without any exchange of data among the edge nodes.

4. The method as recited in claim 1, wherein the federated purity calculation is performed without any exchange of data among the edge nodes.

5. The method as recited in claim 1, wherein each of the edge nodes corresponds to a respective business entity to which the central node provides construction of the model as a service.

6. The method as recited in claim 1, wherein the feature is an attribute of one of the candidates.

7. The method as recited in claim 1, further comprising training, by the central node, the machine learning model using information received by the central node from the edge nodes.

8. The method as recited in claim 7, wherein the information from the edge nodes is aggregated to prevent an unauthorized actor from accessing any information of any of the edge nodes.

9. The method as recited in claim 7, wherein the pairwise masking vectors, which, when summed by the central node, cancel each other out.

10. A non-transitory storage medium having stored therein instructions that are executable by one or more hardware processors to perform operations comprising:

constructing a machine learning model which, when completed, is operable to screen candidates, from a group of candidates, to define a candidate pool that has specified characteristics, and the constructing comprises:

broadcasting, from a central node to edges of a federation, an indication that construction of a random forest of the machine learning model has started;

performing a federated feature categorization of a feature to be included in respective decision trees of the edges, wherein said performing is performed by the central node and is performed based on information received from the edges;

based on the categorizing, broadcasting a feature category to the edges;

performing, by the central node using respective purity information received from the edges, a federated purity calculation; and based on the federated purity calculation, broadcasting, by the central node to the edges, a winning feature split for the feature, wherein the federated purity calculation and the federated feature categorization are performed using a secure aggregation protocol that employs pairwise masking vectors that are structured in a manner so as to guarantee that zero information about any particular edge can be obtained by an entity that has access to only one of the pairwise masking vectors.

11. The non-transitory storage medium as recited in claim 10, wherein the federated purity calculation is based on an information gain determined for the feature.

12. The non-transitory storage medium as recited in claim 10, wherein the federated feature categorization is performed without any exchange of data among the edges.

13. The non-transitory storage medium as recited in claim 10, wherein the federated purity calculation is performed without any exchange of data among the edges.

14. The non-transitory storage medium as recited in claim 10, wherein each of the edges corresponds to a respective business entity to which the central node provides construction of the model as a service.

15. The non-transitory storage medium as recited in claim 10, wherein the feature is an attribute of one of the candidates.

16. The non-transitory storage medium as recited in claim 10, further comprising training, by the central node, the machine learning model using information received by the central node from the edges.

17. The non-transitory storage medium as recited in claim 16, wherein the information from the edges is aggregated to prevent an unauthorized actor from accessing any information of any of the edges.

18. The non-transitory storage medium as recited in claim 16, wherein the pairwise masking vectors, when summed by the central node, cancel each other out.

* * * * *